United States Patent [19]

Goshima et al.

[11] 4,104,573
[45] Aug. 1, 1978

[54] SPEED CONTROL DEVICE FOR A MOVING MEMBER

[75] Inventors: Takeshi Goshima, Tokyo; Yoshinori Sugiura, Kawasaki; Kiyonobu Endo; Hideaki Sato, both of Yokohama; Kimio Kono, Kawasaki, all of Japan

[73] Assignee: Canon Kabushiki Kaisha, Tokyo, Japan

[21] Appl. No.: 612,478

[22] Filed: Sep. 11, 1975

[30] Foreign Application Priority Data

Sep. 14, 1974 [JP] Japan .................. 49-106343

[51] Int. Cl.² .................. G05B 1/06
[52] U.S. Cl. .................. 318/640; 318/593; 250/201
[58] Field of Search .................. 318/640, 625, 593; 250/201

[56] References Cited

U.S. PATENT DOCUMENTS

| | | | |
|---|---|---|---|
| 3,323,030 | 5/1967 | Inaba et al. | 318/593 |
| 3,501,683 | 3/1970 | Webb | 318/640 |
| 3,634,682 | 1/1972 | Gold | 318/640 X |
| 3,708,657 | 1/1973 | Kelling | 318/640 X |
| 3,728,607 | 4/1973 | Isak | 318/608 |

Primary Examiner—B. Dobeck
Assistant Examiner—John J. Feldhaus
Attorney, Agent, or Firm—Fitzpatrick, Cella, Harper & Scinto

[57] ABSTRACT

A speed control device for a moving member which comprises a moving member, driving mechanism for the moving member, position coherent light containing a position information of the moving member, reference coherent light so formed as to not containing the position information of the moving member for required formation of the position coherent light and an interference light, interference light forming means utilizing the position coherent light and the reference coherent light, means for detecting interference light formed by the interference light forming means, and controlling means for the driving means to render the detected output obtained by the detection means to become a sinusoidal wave having a predetermined frequency.

6 Claims, 15 Drawing Figures

A

B

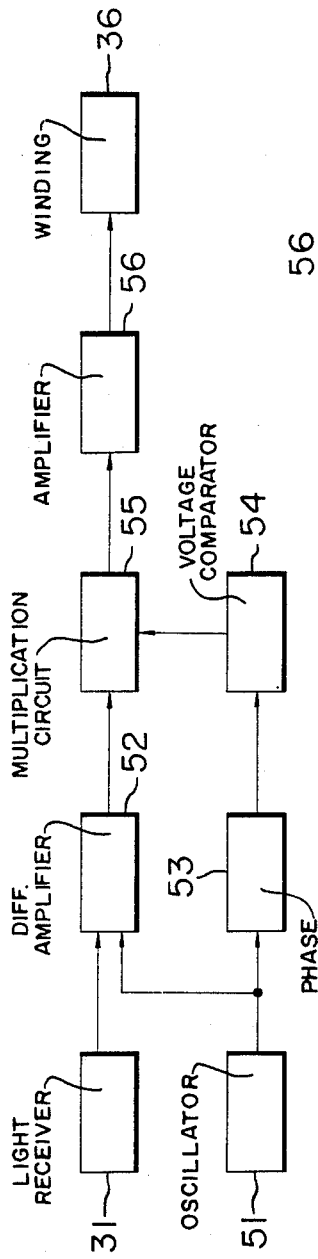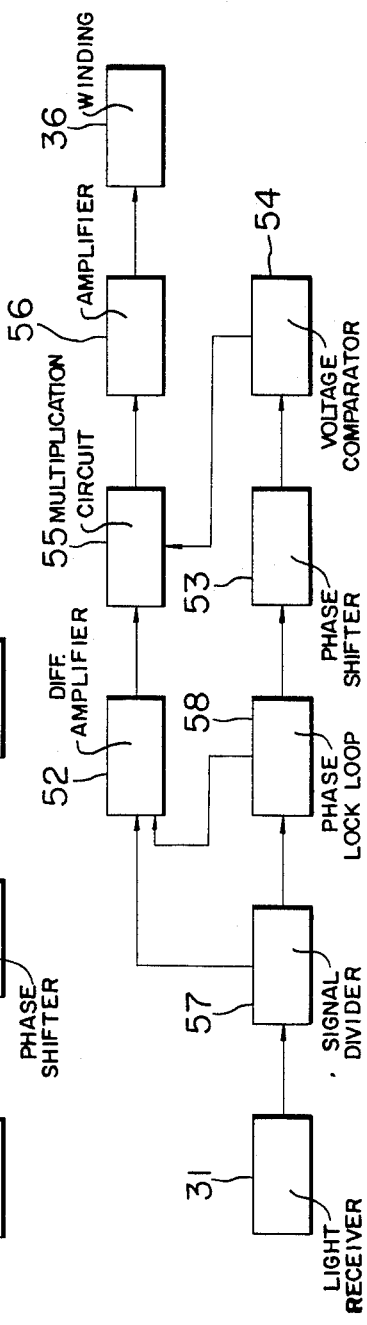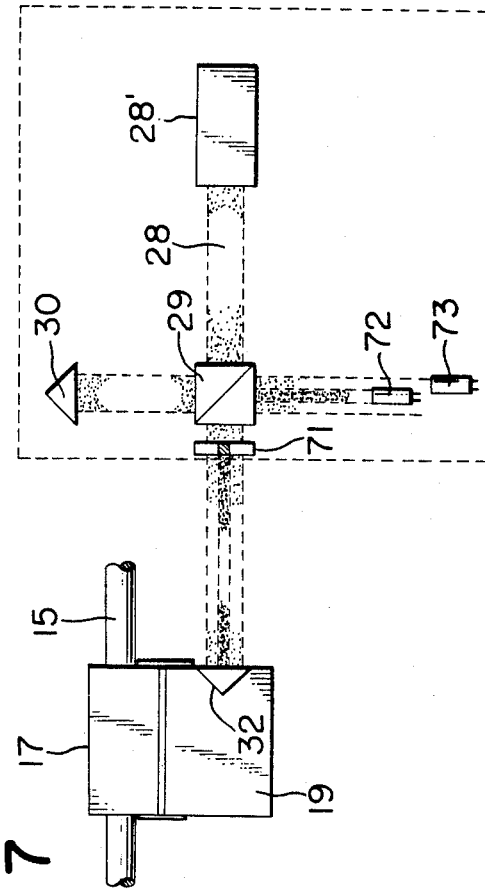
FIG. 5
FIG. 6
FIG. 7

SPEED CONTROL DEVICE FOR A MOVING MEMBER

BACKGROUND OF THE INVENTION

1. Field of the Invention

This invention relates to a speed control device for a moving member, and, more particularly, it is concerned with a device for controlling speed of a moving member wherein a moving condition of the member to undergo a predetermined movement is first detected, and if it differs from a predetermined moving speed, a control operation is effected to rectify this discrepancy between the predetermined moving speed and the actual moving speed.

2. Description of the Prior Art

Heretofore known methods which have been used for forming a spiral track on a disc-shaped recording carrier or medium, or following up the spiral track on the recording carrier have been such that a recording or reproducing head is caused to shift in the radial direction of the recording carrier at a constant speed relative to a speed of the abovementioned recording carrier.

Known as such recording carriers are acoustic record discs, magnetic discs, and so on. In such conventional recording carrier, as the interval between the adjacent tracks is broad, the error in the pitch derived from the mechanical precision in the advancing mechanism of the recording or reproducing head can be reduced to a negligible extent by improving such mechanical precision.

However, in the video-discs with image informations recorded thereon, the development of which has flourished in recent years, the pitches between the adjacent tracks in the radial direction of the video-disc are narrower than that of acoustic record discs by approximately a few tenths of a fraction in view of a large amount of informations being recorded. In this consequence, errors in the mechanical precision of the advancing mechanism of the recording or reproducing head have become unacceptable. That is to say, in the above-described video-disc, as the pitch of the signal track is approximately 1 micron or so, even when the mechanical precision of the advancing mechanism of the head is improved, the mechanical errors to be derived from the advancing mechanism have been unable to be neglected.

SUMMARY OF THE INVENTION

It is therefore a primary object of the present invention to provide a speed control device for a moving member, from which the afore-mentioned disadvantages inherent in the conventional device are all removed, and in which the moving speed of the moving member is coincided with a predetermined moving speed.

It is a secondary object of the present invention to provide a speed control device for a moving member of a simplified construction to attain the matching of the actual moving speed of the moving member with the predetermined moving speed.

It is a third object of the present invention to provide a speed control device for a moving member which performs the speed controlling operation with very high precision to attain the matching of the moving speed of the moving member with the predetermined moving speed.

It is a fourth object of the present invention to provide a speed control device for a moving member having a very quick response characteristic to attain the matching of the actual moving speed of the moving member with the predetermined moving speed.

The foregoing objects and other objects of the present invention as well as actual construction and functions thereof will become more readily understandable from the following detailed description, when read in conjunction with the accompanying drawing.

BRIEF DESCRIPTION OF THE DRAWING

In the drawing:

FIGS. 3A and 3B are for explaining a drive mechanism for the speed control device of the present invention, in which FIG. 3A is a longitudinal cross-sectional view taken along the line A—A' in FIG. 2, and FIG. 3B is a perspective view of the drive mechanism;

FIGS. 5, 6 and 8 are respectively circuit constructions of various embodiments of the speed control device according to the present invention;

FIG. 7 is a front view showing a part of another information recording device, to which the speed control device of the present invention is applied.

DESCRIPTION OF THE PREFERRED EMBODIMENTS

Figure 1:
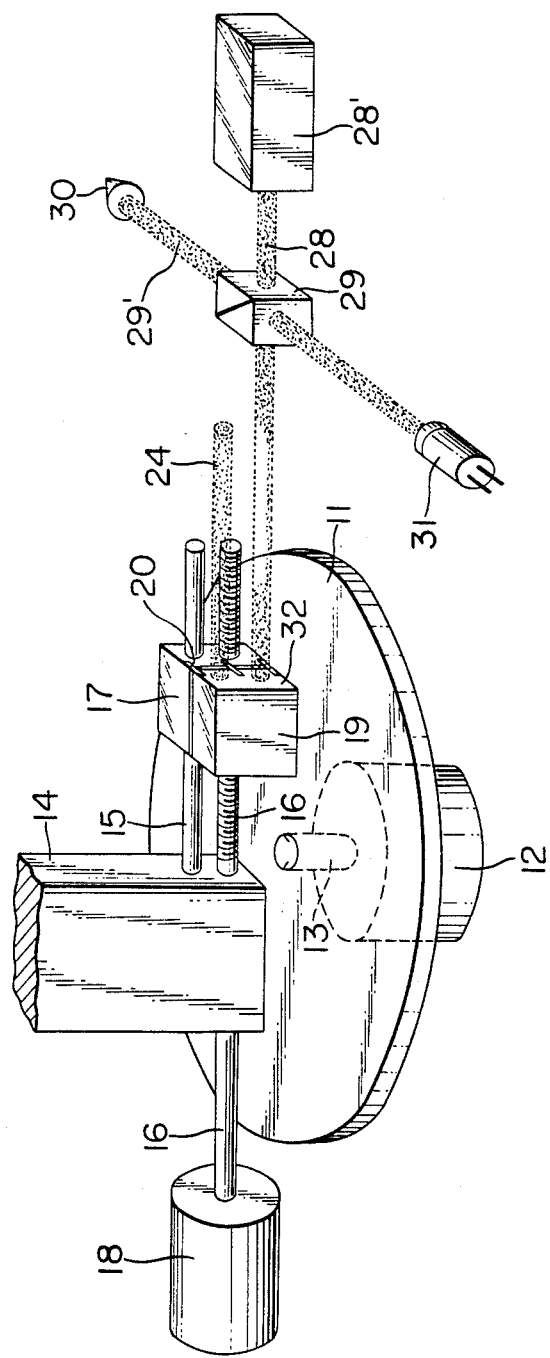
FIG. 1 is a perspective view showing an information recording device, in which the speed control device of the present invention is incorporated.
Figure 2:
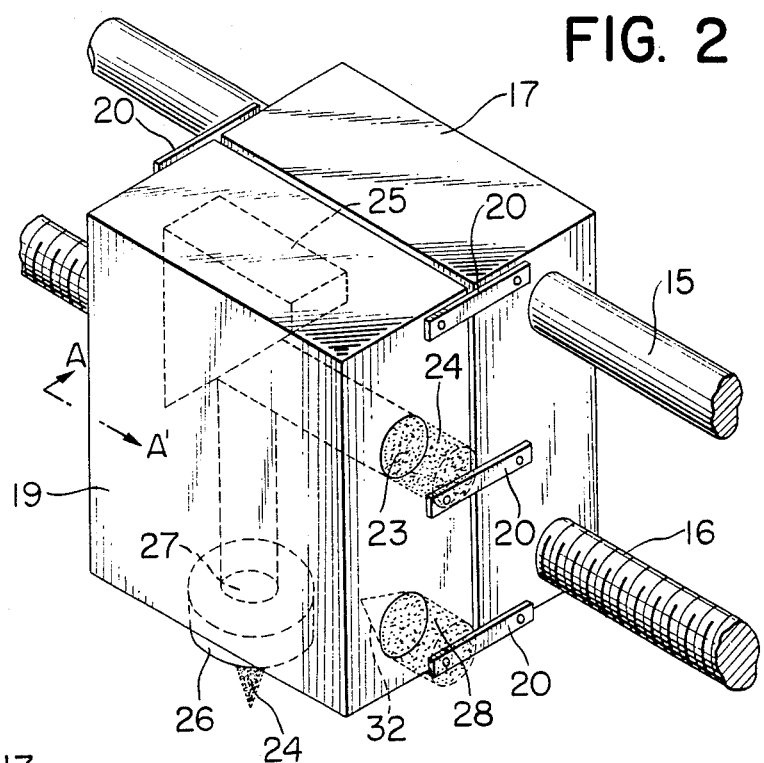
FIG. 2 is an enlarged perspective view showing a movable base stand and a recording or reproducing head of the device shown in FIG. 1.
Figure 3:
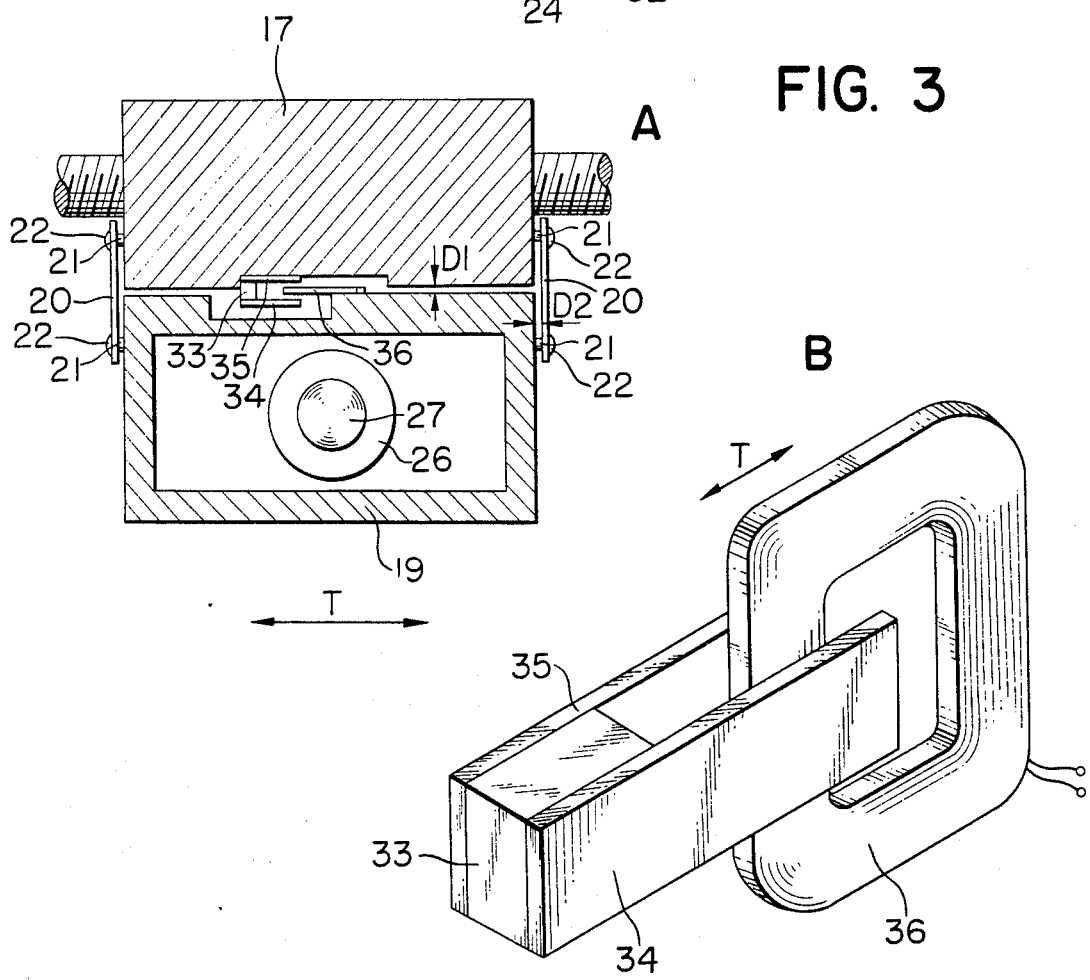

Referring now to FIG. 1, the information recording device, wherein the speed control device for the moving member according to the present invention is incorporated, includes a disc-shaped recording medium 11 sensitive to light irradiation, and rotatably fixed on a rotational shaft 13 of an electric motor 12 which is fixed on a base (not shown) so as to be driven by this motor 12; a supporting base stand 14 integrally formed with the abovementioned base (not shown); a guide rod 15 fixedly provided on this supporting base stand 14 in parallel with the radial direction of the recording medium 11; an advancing screw rod 16 rotatably held in this supporting base stand 14 in parallel with the radial direction of the recording medium 11 as in the case of the guide rod 15, and also in parallel with the guide rod 15; a movable base stand 17 fitted on the guide rod 15 in a freely slidable manner and also screw-fitted on the advancing screw rod 16; another electric motor 18, the rotational shaft of which is fixedly connected with the advancing screw rod 16 (the motor is fixed on the abovementioned base (not shown)), by the rotation of which the supporting base stand can be moved in extending direction of the guide rod 15; and an information write-in head 19, both ends of which are fixed to the movable base stand 17 through a plurality of resilient members 20 such as metal spring plates, etc. with a certain gap $D_1$ with the movable base stand 17 as shown in FIGS. 2 and 3. Being fixed to the movable base stand 17 by means of the resilient members 20, the information write-in head 19 is movable in the direction of a two-headed arrow T with respect to the movable base stand 17, i.e., a direction in parallel with the guide rod 15.

A beam inlet port 23 is further formed in the information write-in head 19, as shown in FIG. 2, through which a laser beam generated from a laser beam generator (not shown) and modulated into a signal beam in parallel with the guide rod 15 by means of a signal to be recorded such as, for example, a TV signal, is introduced into the head 19. The signal beam 24 which has been introduced into the head 19 is reflected by a mirror 25 to change its travelling direction by 90 degrees downward, and is converged on the recording medium 11 by a lens 27 held in a lens holder 26 disposed at the bottom end surface of the head 19.

A laser beam generator 28' which generates laser beam 28 for use in the present invention is provided at the extreme right side of the drawing (FIG. 1), from which the laser beam 28 is projected in parallel with the guide rod 15 in the same manner as the signal beam 24, and irradiates a beam splitter 29. The beam splitter 29 transmits a part of this laser beam 28 as it is, while it reflects the remaining part 29' thereof to change its travelling direction by 90 degrees so as to be irradiated onto a corner reflector 30. The laser beam 29' irradiated on this corner reflector 30 changes its travelling direction by 180 degrees to proceed again toward the beam splitter 29, passes through the beam splitter, and reaches a light receiving element 31 as a reference light.

On the other hand, the laser beam 28 which has passed through the beam splitter 29 reaches a corner reflector 32 fixedly provided in the head 19 where it changes its travelling direction by 180 degrees to again proceed toward the beam splitter 29, at which the laser beam 28 is reflected by 90 degrees to reach the light receiving element 31. Accordingly, the light receiving element 31 will finally receive an interference light of two laser beams reflected by the corner reflectors 30 and 32.

That is, in the light receiving surface of this light receiving element 31, there take place two cases, the one being such that, depending on the position of the corner reflector 32, the beams reflected by both corner reflectors 32 and 30 cause a mutually strengtheing interference to become bright, and the other being such that both beams cause a mutually weakening interference to become dark. Such two types of the interference appear with a period, in which the corner reflector 32 shifts by $\lambda/2$ (where $\lambda$ is a wavelength of laser beams 28 and 29'), being made as one cycle. A photoelectric conversion output from the light receiving element 31 which receives such interference lights should be a sinusoidal wave and its frequency should also be constant, provided that the abovementioned moving member moves on the guide rod at an exactly constant speed. Incidentally, the laser generator 28, the beam splitter 29, the corner reflector 30, and the light receiving element 31 are all fixedly provided on the abovementioned base (not shown).

In the information recording device of the aforedescribed construction, a spiral record track can be formed on the recording medium 11 by driving the motors 12 and 18 at a constant speed, and the pitch between the adjacent record tracks must be equal. However, in reality, the movable base stand 17 does not always move at a constant speed due to various factors such as, for example, lack of mechanical precision in the advancing screw rod 16, lack in precision of the screw-fitting between the advancing screw rod 16 and the movable base stand 17, variations in friction between the guide rod 15 and the movable base stand 17 due to finishing precision of the guide rod 15, mechanical errors in the motor 18, and various other factors. Accordingly, the pitches between the adjacent record tracks on the recording medium 11 inevitably vary.

The device according to the present invention is therefore to detect such mechanical errors, and to rectify the position of the head, for the purpose of which the drive mechanism as shown in FIG. 3 is provided between the movable base stand 17 and the head 19, which mechanism is controlled by an information relative to the moving speed of the head as obtained from the light receiving element 31 to vary the position of the head with respect to the movable base stand 17, whereby the moving speed of the head 19 can be controlled.

This drive mechanism will be more specifically explained in reference to FIGS. 3A and 3B. In FIG. 3A, there is shown a longitudinal cross-section of the movable base stand 17 and the head 19. Both movable base stand 17 and head 19 are fitted with the drive mechanism as shown in FIG. 3B. By applying electric current to the drive mechanism, the head 19 can be moved in the two-headed arrow directions T with respect to the movable base stand 17. The direction and magnitude of the movement may be controlled by the direction and magnitude of the electric current to be applied to the drive mechanism.

The drive mechanism shown in FIG. 3B comprises a magnet 33, yoke plates 34 and 35 respectively fixed at the N and S poles of the magnet 33, and a winding 36 interposed between these yoke plates 34 and 35. By thus fixing the magnet and the yoke plates to the movable base stand 17, and the winding 36 to the head 19, as shown in FIG. 3A, and causing electric current to pass through this winding 36, the head 19 moves in the directions of the arrow T with respect to the movable base stand 17. Such drive mechanism should preferably be positioned in the vicinity of the center of gravity of the head 19.

Now assume that the abovementioned motors 18 and 19 are driven at a constant speed, and the movable base stand is also accurately shifted. In this case, there appear dark and bright regions on the light receiving element due to the abovementioned strengtheing interference and weakening interference, so that a sinusoidal wave signal having a definite frequency is obtained from the light receiving element 31. In other words, where there is an error in advancing this head 19, the sinusoidal wave signal to be obtained from the light receiving element 31 collapses, or its frequency undergoes variations. Accordingly, errors in the advancing operation can be corrected by first generating a reference signal having a frequency identical with that of a sinusoidal wave which would be obtained from the light receiving element when the movable base stand 17 and the head 19 move in an idealistic condition comparing this reference signal with a signal to be obtained from the same light receiving element, and applying any error signal to be resulted from this comparison to the abovementioned winding 36.

FIG. 5 shows one embodiment of a circuit for forming the error signal to be impressed on the winding 36. In the actual operation of this error signal forming circuit, the differential signal is detected by applying to the differential amplifier 52 a detection signal to be obtained from the light receiving element 31 when the head 19 is caused to move, and an output from an oscillator 51 to generate the reference signal synchronous with the abovementioned detection signal and having the same frequency as that of the signal which would be obtained from the light receiving element 31 when the head 19 moves in its idealistic condition.

This differential signal is a subtracted result of an output signal 41 or 42 of the light receiving element from the reference signal voltage, when an output signal from the light receiving element 31 is about to deviate from the reference signal 40 by a curve 41 or 42. That is, when the head 19 moves faster than its predetermined moving speed during the time period of from $t_1$ to $t_3$, a positive error curve 41 is obtained, and when the head 19 moves slower than the predetermined moving speed during the same period, a negative error curve 42 is obtained. However, during the time period of from $t_3$ to $t_5$, the error signal to be obtained when the head 19 moves faster than the predetermined moving speed becomes a negative, as shown by a curve 43, while the error signal to be obtained when the head moves slower than the predetermined moving speed becomes a positive as shown by a curve 44. Thus, the output from the differential amplifier varies for every phase angle $\pi$, so that it is necessary to change the polarity of the error signal at every time this phase change occurs.

Figure 4:
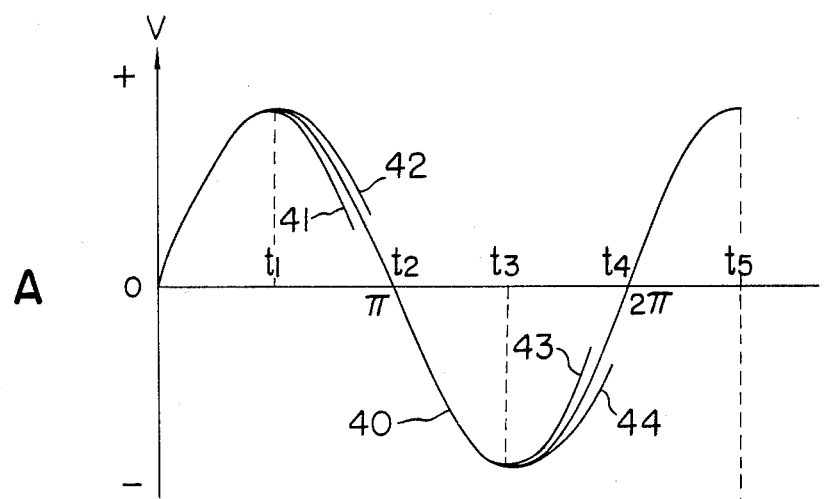
FIGS. 4A and 4B are respectively waveforms for explaining the operations of the speed control device according to the present invention.
Figure 4:
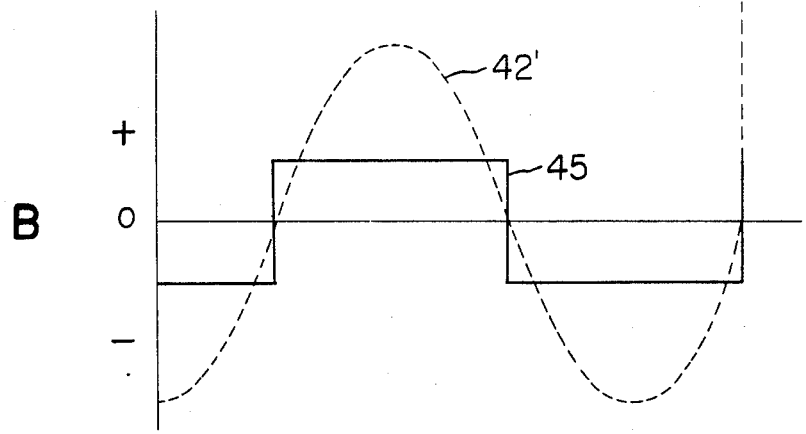

In FIG. 5, the light receiving output from the light receiving element 31 is impressed on one of the input terminals of the differential amplifier 52, while, at the same time, a part of the output from the oscillator 51 (which can be constructed by a crystal oscillator, etc.) to generate the reference signal is impressed on the other input terminal of the differential amplifier 52 to detect a difference from the abovementioned light receiving output. Therefore, while a differential signal between the light receiving output and the reference signal is taken out of the differential amplifier 52, the differential signal does not accurately indicate whether it is positive or negative, so that the required polarity is given to the differential signal by means of a 90° phase shifter which shifts the phase of the impressed signal by 90°, a voltage comparator 54 which, as the result of comparison between the applied input signal and the reference voltage (which is O(ν) in the case of FIG. 5), produces a definite positive potential E when the voltage of the input signal is higher than that of the reference voltage and a definite negative potential E when the voltage of the input signal is lower than that of the reference voltage, and a multiplication circuit 55 which multiplies the signals applied to the two input terminals. That is, as shown in FIG. 4B, the phase of the reference signal is phase-shifted by 90° as denoted with a dotted line 42' as the result of comparison with the waveform 42 in FIG. 4A by the 90° phase shifter, after which the phase-shifted signal is impressed on the voltage comparator 54, wherein it is level-changed at the O potential point of the waveform 42° as shown by a solid line 45 in FIG. 4B. As the result, a rectangular waveform having a positive level at the positive portion of the waveform 42' and a negative level at the negative portion thereof can be obtained. When this rectangular waveform 45 is impressed on the multiplication circuit 55 together with the abovementioned differential amplifier 52, the differential signal having a corrected polarity can be obtained from the multiplication circuit.

By thus amplifying the signal by the amplifier 56 to an appropriate magnitude, and applying its output to the winding 36 of the drive mechanism, it becomes possible to cause the head 19 to move a very short distance with respect to the movable base stand 17, and to correct any error in advancing the head.

FIG. 6 shows another embodiment of the error signal forming circuit, wherein an output signal obtained from the light receiving element 31 is divided into two portions by a signal divider 57, one of which is given a sufficiently large response time constant to be applied as an input of a PLL (Phase Lock Loop) circuit whose response characteristic to the frequency variation has been delayed so that the output from this PLL circuit may be treated equally as the output from the oscillation circuit 51 in FIG. 5. That is to say, since the head 19 is driven by the motor 18 which rotates at a predetermined number of revolution, the average value of its speed possesses a reference speed corresponding to the reference signal. However, when a certain short time period is chosen, there is contained a speed error, so that a signal having an average frequency of the light receiving frequency of the light receiving output is capable of becoming the reference signal.

For such purpose, this embodiment takes the response time constant sufficiently large, and the PLL (Phase Lock Loop) circuit whose response has been delayed with respect to the frequency variation is replaced for the oscillator circuit 51 in FIG. 5.

The circuit components in FIG. 6 designated by the same reference numerals as in FIG. 5 function in the same manner as those described and shown in FIG. 5. It is therefore feasible that an error signal is generated by the similar operations as in FIG.5, and the thus generated error signal is impressed on the winding 36 to cause the head 19 to move with respect to the movable base stand 17 to rectify errors in the head position, whereby the pitch to be formed in the radial direction on the recording medium 11 can always be made constant.

In FIGS. 5 and 6, the output signal from a single light receiving element 31 is compared with the reference signal to lead out an error signal. However, as the output of this error signal is very small at the portions of valley and peak of the sinusoidal waveform, accurate error signal is difficult to obtain.

FIG. 7 shows a further embodiment of the device, from which such defect is removed. In this embodiment, two interference light beams which are mutually phase-shifted by 90° are produced, then these two interference light beams are detected by two light receiving elements, and an error signal to be obtained from a portion of a steep inclination in the detected signal waveform is alternately selected and taken out, whereby a very small error in the movement of the head 19 can be taken out as a large error signal.

The embodiment of the speed control device of a moving member, in which two light receiving elements are used, as shown in FIG. 7, is of almost the same construction as that shown in FIGS. 1 to 3 (the same component parts as those in FIGS. 1 to 3 are designated by the same reference numerals). The point of difference from the previous embodiment is that a phase plate 71, at which the phase of the light beam between its center part and its other parts are shifted by $\lambda/8$, is fixedly provided in one part of a path between the beam splitter 29 and the corner reflector 32, and, at the same time, two light receiving elements are provided, one of which (light receiving element 72) receives the center part of the beam, and the otherof which (light receiving element 73) receives the peripheral part of the beam. That is, the center part of the beam which passes through the beam splitter 29, is reflected at the corner reflector 32, and is again reflected as the beam splitter 29 passes the phase plate 71 two times, so that its phase shifts by λ/4 between its center part and the peripheral part. Consequently, if the head 19 is moved at a constant speed, there are obtained output signals from the light receiving elements 72 and 73 respectively with their phases being shifted by 90°. As the result, by appropriately changing over the outputs from the light receiving elements 72 and 73 for use, the optimum error signal can be obtained.

Figure 8:
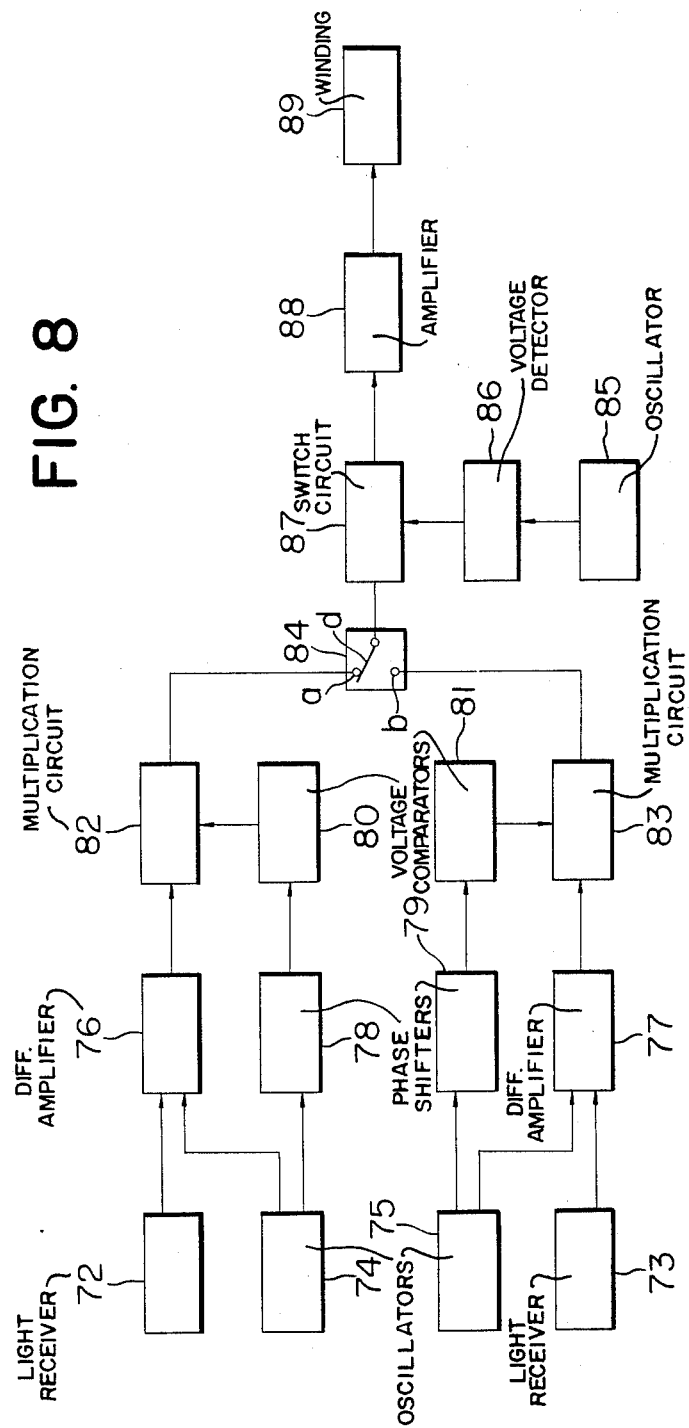
Figure 9:
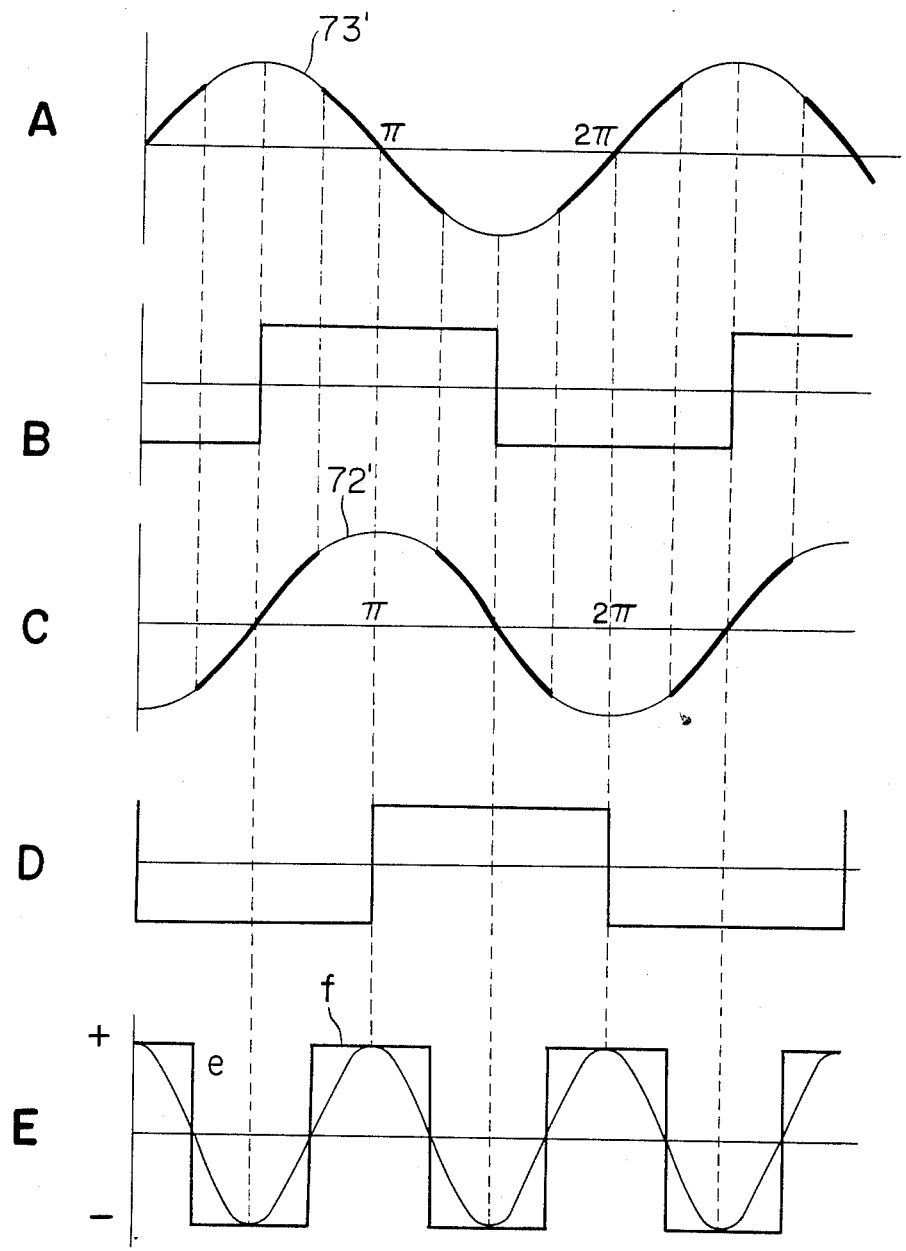
FIGS. 9A to 9E are respectively waveforms for explaining the operations of the circuit shown in FIG. 8.

FIG. 8 shows a still further embodiment of the error signal forming circuit, in which two light receiving elements as shown in FIG. 7 are used by selective change-over operations. The curves 73' and 72' shown in FIGS. 9A and 9C are respectively the output signal waveforms by light receiving elements shown in FIG. 7. The output signal (FIG. 9A) of the light receiving element 73 has a phase difference of 90° in comparison with the output signal (FIG. 9C) of the light receiving element 72. These output signals are impressed on the differential amplifiers 76 and 77 so as to take out difference components of the oscillators 74 and 75 which oscillate in the same phase as the respective output signal.

On the other hand, the other part of the oscillation outputs from the abovementioned oscillators 74 and 75, after they are impressed on the 90° phase shifters 78 and 79 similar to that shown in FIG. 5 (with a reference numeral 53), is further applied to the voltage comparators 80 and 81. Then, the signals as shown in FIGS. 9B and 9C obtained from the voltage comparators 80 and 81 are applied to the multiplication circuits 82 and 83 to correct the polarity of the differential signal obtained from the differential amplifiers 76 and 77.

The outputs from these multiplication circuits 82 and 83 are connected respectively to the contacts $a$ and $b$ of the switch 84. Accordingly, by controlling the contact piece $d$ of the switch 84, a desired output can be taken out of the multiplication circuit. In this error signal forming circuit, there is further provided an oscillator 85 which synchronizes with the oscillator 75 to oscillate a signal having twice as high a frequency as that from the oscillator 75, the resultant sinusoidal wave being as shown in FIG. 9E (curve $e$). Such sinusoidal wave, when applied to the voltage detector 86, generates a rectangular waveform $f$ in FIG. 9E.

In accordance with what has been described, when the rectangular wave signal is impressed on the switch circuit 87 for controlling the switch 84, and the control is effected in such a manner that, when the rectangular wave signal is positive, the contact piece contacts the contact $b$, and when it is negative, the contact piece $d$ contacts the contact $a$, whereby the steep inclination portions of the output signal waveforms shown in thick lines in FIGS. 9A and 9C can be alternately selected.

The error signal which has been taken out in the abovedescribed manner is amplified by the amplifier 88 to a magnitude sufficient to drive the winding 89, after which it is applied to the winding 89 which constitutes the drive mechanism. By thus using the two light receiving elements through the change-over operations, detection can always be performed at the large dynamic range of the error signal, whereby the error signal can be detected with high sensitivity.

Although, in the foregoing, the present invention has been described with particular reference to preferred embodiments, it should be understood that these are merely examples and not so restrictive, and that changes and modifications may be made by those skilled in the art within the purview of the foregoing description and the appended claims.

What is claimed is:

1. An optical head moving apparatus comprising:
   a movable base stand (17);
   first driving means (18) for moving said movable base stand in predetermined direction at a constant speed;
   an optical head (19) to be moved at a constant speed, said optical head having an optical system for projecting a light beam, and light reflecting means;
   coupling means (20) coupling said optical head with said movable base stand such that said optical head is movable with respect to said movable base stand while said first driving means is operative to move said movable base stand;
   a first position coherent light obtained by irradiation onto said reflection means of a laser beam from a laser beam generator fixedly disposed at a predetermined position;
   a second position coherent light obtained by irradiation onto said reflecting of a laser beam from said laser beam generator, said second position coherent light being different in phase from said first position coherent light;
   a reference coherent light;
   means for forming first and second interference lights by combination of said first and second coherent lights, and said reference coherent light;
   first detecting means for detecting said first interference light;
   second detecting means for detecting said second interference light;
   means for producing sinusoidal waveform of first and second reference signals having a predetermined frequency, resspectively, but different in phase from each other;
   first comparison means for comparing the output from said first detecting means with said first reference signal;
   second comparison means for comparing the output from said second detecting means with said second reference signal;
   means for alternately selecting the output from said first comparison means and the output from said second comparison means in accordance with their amplitude; and
   means for applying an output from said selecting means to said second driving means to control same such that the outputs from said first and second detecting means coincide with said first and second reference signals, respectively.

2. An apparatus according to claim 1, wherein said coupling means is an elastic member.

3. An apparatus according to claim 2, wherein said elastic member is a plate spring.

4. An apparatus according to claim 1, wherein said second driving means comprises:
   a magnetic member the different polarities of which are opposed to each other through a gap; and
   a winding interposed in the gap.

5. An apparatus according to claim 1, wherein said first driving means comprises a transmission screw rod engaged with said movable base stand, and a motor for revolving said transmission screw rod at a constant speed.

6. An apparatus according to claim 1, wherein said optical head includes means for changing the course of a light beam, and a convergent lens for converging the light beams so changed.

* * * * *

UNITED STATES PATENT AND TRADEMARK OFFICE
CERTIFICATE OF CORRECTION

PATENT NO. : 4,104,573
DATED : August 1, 1978
INVENTOR(S) : TAKESHI GOSHIMA, ET AL It is certified that error appears in the above-identified patent and that said Letters Patent are hereby corrected as shown below:

In Claim 1:

Column 8, line 22, after "reflecting" insert --means--;

line 36, change "resspectively" to --respectively--.

Signed and Sealed this

Twenty-sixth Day of June 1979

[SEAL]

Attest:

RUTH C. MASON
Attesting Officer

DONALD W. BANNER
Commissioner of Patents and Trademarks